March 13, 1934.  H. ROSENTHAL  1,950,520
MEANS OF POWER TRANSMISSION
Filed April 19, 1933
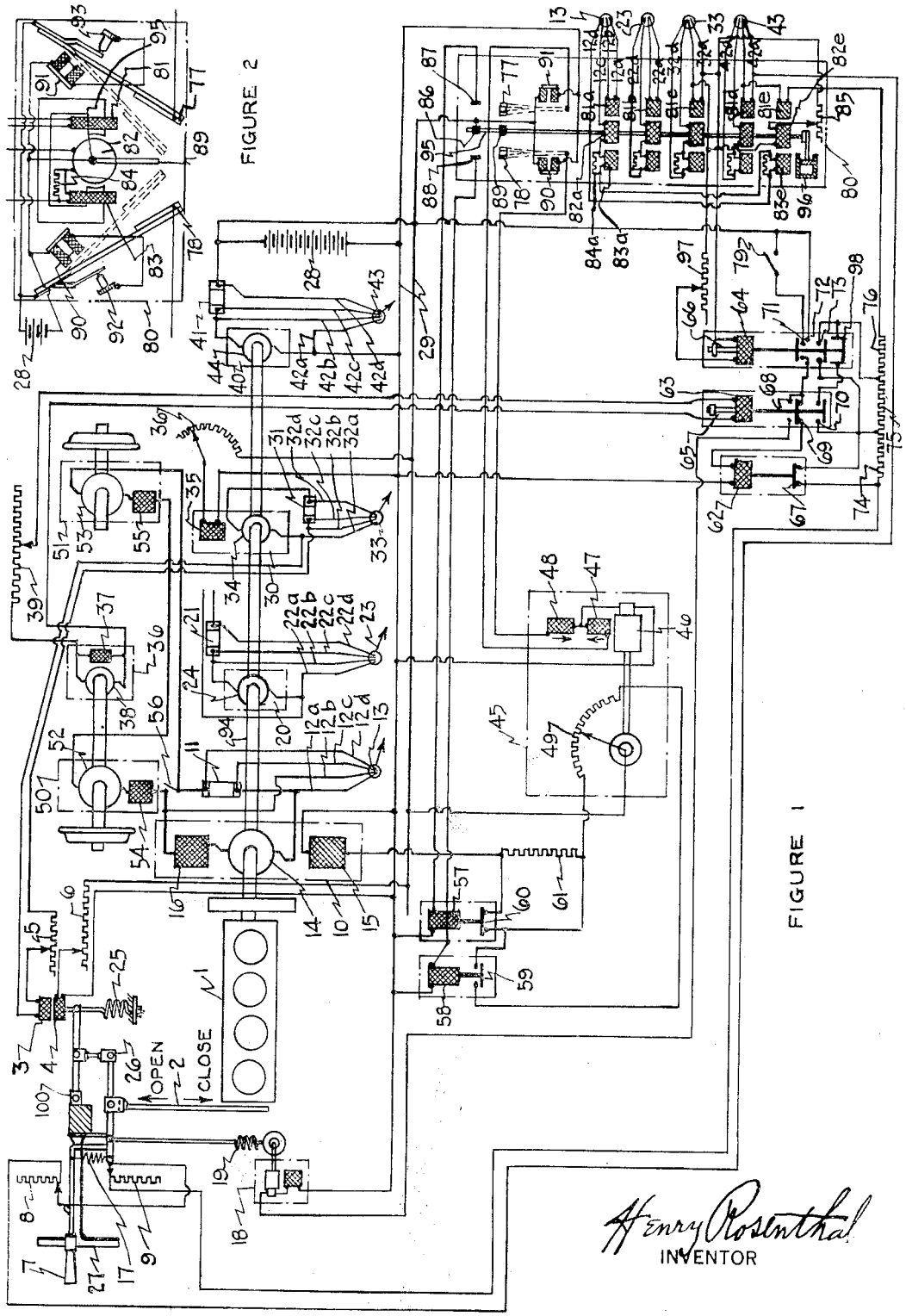
*Henry Rosenthal*
INVENTOR Patented Mar. 13, 1934

1,950,520

UNITED STATES PATENT OFFICE 1,950,520

MEANS OF POWER TRANSMISSION

Henry Rosenthal, New York, N. Y.

Application April 19, 1933, Serial No. 666,819

19 Claims. (Cl. 290—17)

My invention relates to means and methods of power transmission and more particularly to an improvement in means and method of transmitting power from the prime mover to the driving wheels in automotive equipment. However, I do not limit my invention to this use and neither do I limit it to any particular type of engine, as any prime mover may be used.

It is well known that higher efficiency is usually attained when operating an engine at or near full load than when such engine is lightly loaded. One of the objects of my invention is to provide means whereby the engine will be operated at or near full load for the greater part of the time that it is in use, and at the same time provide means for limiting the speed of the prime mover.

What I mean herein by "full load" is the condition when the engine is operating at substantially the maximum brake mean effective pressure for which it is designed and for the speed at which the engine is operating. "Full load" for any engine is thus a variable quantity, increasing with the engine speed. It may be the case that "full load" as described above, is a higher load than that at which the engine will deliver energy with the greatest economy. If this were the case, it may be desirable to interpose in the system an adjustment which would limit the maximum steady output of the engine at any given speed to that at which the engine operates at substantially maximum economy. Under this condition the "economic load" would become the "full load" as described above, and used in this invention. My system may be operated all of the time at "full load" of the engine or at "economic load" or part of the time at "full load" and part of the time at the "economic load", or vice versa.

By means of my invention, the prime mover can be operated at or near full load and will automatically adjust itself to variations in applied load. My invention consists in means and method of automatically regulating the speed of the prime mover by means of the horse power of the applied load and the speed of the prime mover. Included are means of controlling and limiting the speed of the apparatus being driven; means of limiting the speed of the prime mover; means of interconnecting the means limiting the speed of driving apparatus and the means limiting the speed of the prime mover; and means for modifying the natural ungoverned torque characteristics of the prime mover.

This invention is an extension of my inventions, Serial 503,458, filed Dec. 19, 1930; Serial 541,629, filed June 2, 1931. Certain broader features of the arrangement herein disclosed are claimed in these co-pending applications. In the former of these is claimed the combination of a prime mover, an intermediate member and a driving member in which the torque of the intermediate member is adjusted by separate metering means so that the prime mover speed increases on increase in load. Also included are means controlling the speed of the driving member. In Serial 541,629 are included the combination of prime mover, intermediate member, driving member, and controlling member metering the torque of the intermediate member so that the prime mover speed increases on increase in load, all combined with means limiting the speed of the prime mover.

The present invention is applicable to an electric transmission in which there are one or more generators being driven by the prime mover, such for instance as a generator for operating the driving motors, a generator for charging batteries, a generator for measuring the speed of the prime mover, and a generator for miscellaneous power purposes. However, it is not limited to this particular arrangement. In the co-pending applications, referred to above, control of the prime mover was effected by means of a relay directly measuring the torque of the generator operating the driving motor. The method of measuring this torque comprised two co-acting coils, one of which carried current proportional to the field current of the generator and the other of which carried current proportional to the armature current of the generator. The torque of the principal generator was thus directly measured by means substantially proportional to the product of the flux and armature current of this generator. This method is easily adaptable to the measuring of the torque from one generator, but is not easily adapted to the measurement of torque from a plurality of generators, especially if one of the generators has special field or armature connections, as is usually the case with a constant potential, variable speed generator.

In the present invention, this objection is obviated and I use a method easily applicable to the measurement of the torque of several generators which is new and novel so far as I am aware. This method makes use of the proportionality of torque to power divided by speed. Thus I use a number of wattmeter elements, (one for each generator) which are connected to a common shaft. If each wattmeter element measures the power of a separate generator, the sum of the force produced by the elements on the shaft will be proportional to the total power delivered by all of the generators, if the wattmeter elements are properly designed. If the restraining force which opposes the movement of the common shaft, upon which the wattmeter elements are mounted, varies proportionally to the speed of the prime mover driving the generators, then when the force of the wattmeter elements balances the force of the restraining element, the power will be proportional to the speed of the prime mover, and will therefore be substantially proportional to the brake-torque of the generator. Such a metering element may be used as a relay to control the field of one of the generators, preferably the generator supplying the driving motors. The method of such control will be explained in greater detail later in these specifications.

With a steam engine, if the governor is removed and the throttle or cut-off valve is maintained in a fixed position, the engine will take a substantially constant amount of steam per stroke irrespective of the speed of operation. The power delivered will vary substantially with the speed and there will be only slight variation in brake torque with speed. Due to less wire drawing and less friction at low speeds, the torque at low speeds will be somewhat higher than at high speeds. With an Otto cycle engine, for each power stroke each cylinder takes a charge of air and fuel, and the amount of air and the amount of fuel per cylinder charge will be substantially the same for any setting of the throttle or other controlling means, regardless of the speed of operation, but will usually decrease somewhat as the engine speed increases. Thus, like the steam engine, the power of an Otto engine will vary substantially in proportion to the speed of the engine, at any given setting of the means controlling the working medium. The Diesel engine operates on an air cycle taking in substantially the same amount of air per cylinder for each power stroke. However, the amount of fuel delivered to the cylinder is always insufficient to form a perfect air-fuel mixture. Therefore, if the amount of fuel delivered per stroke is changed, the work done per stroke will be changed substantially in proportion to the fuel. With those Diesels which have a fuel pump per cylinder, or which have a fuel pump and distributer, so that at any given setting of the governor, a fixed amount of fuel is measured per power stroke and delivered to the cylinder, the work per stroke will remain substantially constant and the power will vary substantially in accordance with the speed. I use the general term "Diesel" to cover any type of standard Diesel or dual combustion engine. However, certain Diesel engines operate on what is known as the "common rail" system of fuel injection. In this system a substantially fixed pressure is maintained on the fuel oil line and the amount of fuel delivered per stroke depends upon the length of time the injection valve is open.

Such engines are commonly built with the injection valves controlled by cams which operate over a fixed angular movement of the engine for any fixed position of the governor. Thus for any fixed governor position, the amount of fuel which is delivered per stroke will be considerably greater at low speeds where a relatively long time is required to pass through the fixed angular movement, than is delivered at high speeds where the injection valve would be open for only a relatively short time. The work per stroke would thus be considerably higher at low speeds than at high speeds, for a fixed setting of the injection valve control. If the setting were such that substantially full mean effective pressure were developed at high speeds, then at low speeds the mean effective pressure developed would be beyond safe limits. This characteristic of "common rail" Diesels may be compensated by providing means responsive to the speed of the prime mover whereby the angular time of opening of the injection valve is decreased as the speed of the prime mover decreases. This can be so controlled that the delivered torque of the engine decreases slightly from low speed to high speed and the delivered power varies substantially in proportion to the speed. I provide such means of regulating the fuel supply and also provide means of modifying the torque characteristics of the other types of prime movers discussed if modification of these characteristics should be either necessary or desirable. In any event, I prefer that the prime mover delivers a slightly decreasing torque as the speed of the prime mover increases.

I have explained how a relay in which the actuating force is substantially proportional to the power delivery and the restraining force is substantially proportional to the prime mover speed, substantially measures the torque. If such a relay is connected to reduce the field strength of the generator when the actuating force is greater than the restraining force and to increase the field strength of the generator when the actuating force is less than the restraining force, then the relay will act to hold the torque restraining the prime mover at substantially constant value, unless means are provided to prevent such constancy. I provide such means by providing proper coils on the relay, whereby the torque opposing the rotation of the prime mover may be reduced as the load is increased, and may be increased as the load is reduced. This permits of an increase in speed of the prime mover as the load increases.

If when the prime mover reaches a predetermined maximum speed the strength of the restraining coil of the relay be increased, then the relay will act to increase the torque opposing rotation of the prime mover and the prime mover will be prevented from further increase in speed.

If when the prime mover reaches a predetermined minimum speed, the strength of the restraining coil of the relay be reduced, then the relay will act to decrease the torque opposing rotation of the prime mover and the prime mover will be prevented from further decrease in speed.

By arranging the system in such a manner that the restraining coil of the relay is strengthened when the prime mover reaches a predetermined maximum speed and is weakened when the prime mover reaches a predetermined minimum speed, the prime mover can be kept in operation within a pre-determined speed range. In certain classes of service, more especially on certain railway services, it is sometimes desirable to operate at or near the maximum power output of the prime mover. This can be accomplished with my invention by adjusting the predetermined maximum and minimum speeds within a narrow range and preferably close to that speed of the prime mover at which the maximum safe power can be delivered.

The speed of the vehicle may be controlled by adjusting the strength of the restraining coil of the relay. When it is desired to increase the speed of the vehicle, reducing the strength of the restraining coil of the relay will act to increase the speed and power of the prime mover as well as the voltage of the generator, and will thus act to increase the vehicle speed. When it is desired to decrease the speed of the vehicle, increasing the strength of the restraining coil of the relay will act to decrease the speed and power of the prime mover as well as the voltage of the generator and will thus act to decrease the vehicle speed. This action may be brought about when the vehicle reaches a predetermined maximum speed and thus act as a speed limiting means for the vehicle.

As the minimum speed control of the prime mover acts to reduce the strength of the restraining coil of the relay and the speed limiting control of the vehicle acts to increase the strength of the restraining coil of the relay, it is evident that these two controls cannot operate on the relay at the same time. Under certain conditions, such as certain times when the vehicle is traveling down grade, the power requirements would be small and therefore the prime mover will operate at low speed. At the same time the vehicle may be traveling at a high rate of speed. In order to prevent both prime mover under speed and vehicle overspeed control from acting simultaneously on the relay restraining coil, I interlock these two controls in such a manner that the prime mover is kept from stalling by a reduction in the strength of the relay restraining coil and at the same time prevent overspeed of the vehicle by acting to reduce the the propelling fluid delivered to the engine per stroke of the piston.

My invention is shown diagrammatically in the accompanying drawing but I do not limit it to the form shown. My invention will better be understood by reference to the following description taken together with the attached drawing forming a part of this specification, and in which Figure 1 shows schematically the essentials of one embodiment of my invention.

Figure 2 shows schematically certain details of the controlling relay.

In the figures similar numbers refer to like parts.

Referring to Figure 1, the prime mover 1 is connected by suitable means, such as shaft 94, to the electric generators 10, 20, 30 and 40. The generator 10 is the principal generator and is adapted to furnish electricity to the vehicle driving motors 50 and 51. The generator 40 as shown is a constant potential variable speed generator connected to charge a battery 28, and may be of any well known design. Generator 30 as shown is adapted to generate a potential proportional to the speed of the prime mover. Generator 20 as shown is of any type as may be required on the vehicle for auxiliary service.

Generator 30 is for direct current and has a separately excited field 35 excited from the battery bus 29 through the adjustable resistance 36. As the field 35 remains constant for any position of the adjustable resistance 36, the potential developed will be substantially proportional to the rotative speed of the armature 34 and so of the prime mover 1.

Generator 10 is shown for direct current and as having an armature 14, a series field 16 and a separately excited field 15, the latter being excited from the battery bus 29 through the resistance 61 and a portion of resistance 49 of the motor operated rheostat 45. The amount of these resistances in the circuit is controlled by the measuring relay 80, the operation of which will be explained later.

Generator 10 has in series with it a shunt 11. The current leads 12c and 12d from the shunt, as well as the potential leads 12a and 12b from the generator, are conducted through conduit 13 to the relay 80.

Similarly generator 20 has shunt 21; current leads 22c and 22d; potential leads 22a and 22b; and conduit 23 through which the current and potential leads are conducted to relay 80. In a like manner generator 30 has shunt 31 and generator 40 has shunt 41, and the current and potential leads from these generators are conducted to the relay 80 in conduit 33 from generator 30 and conduit 43 from generator 40. The potential leads for the two generators are 32a and 32b and 42a and 42b respectively; the current leads are respectively 32c and 32d and 42c and 42d.

I prefer that for each generator connected to the prime mover there be one set of current and potential leads connecting the prime mover to the measuring relay 80, and that for each set of current and potential leads from a single generator there be a separate wattmeter element on relay 80. Such an element is best illustrated in Figure 2 which shows a plan view of a single element having the compound field comprising the potential element 81 and the current element 83, the latter being in series with the armature 82, and being shunted by the resistance 84.

As shown in Figure 1, there are four such wattmeter elements, one for each of the four generators. The field potential coils are labeled 81a, 81b, 81c and 81d for generators 10, 20, 30 and 40 respectively. The armatures of each of the wattmeter elements are connected to the common shaft 95 which carries the rotating contacts 86 and 89. These wattmeter elements are all connected to cause a rotation of shaft 95 to the right (Figure 1), counter clockwise (Figure 2.)

Also connected to the common shaft is the armature 82e of a wattmeter element having the compound field 81e and 83e. The armature 82e is energized through adjustable resistance 85 by the variable potential of generator 30 which is proportional to the speed of the prime mover and is conducted to the relay 80 by leads 32a and 32b. The field 81e is energized by the constant potential of the battery 28 and conducted to the relay 80 by the potential leads 42a and 42b of the battery charging generator 40. The field 83e is energized by current from generator 10 and is connected in series with relay coils 81a and 84a, being shunted by a suitable resistance. This watt meter element is connected to rotate the shaft 95 in a direction opposed to the other wattmeter elements and acts as the restraining and balancing force for the relay.

Dash pot 96, connected to the shaft 95, acts to steady the action of the relay and to prevent the relay contacts being made from road jars and other extraneous forces.

The action of the relay can best be explained by first neglecting the action of the modifying compound field coils 83a, 83b, . . . 83e. Coil 81a acting on armature 82a causes a torque on shaft 95 proportional to the power delivered by generator 10. Similarly, coil 81b acting on armature 82b causes a torque on shaft 95 proportional to the power delivered by generator 20. Likewise, coil 81c and armature 82c cause a torque proportional to the power delivered by generator 30; and coil 81d and armature 82d cause a torque proportional to the power delivered by generator 40. If these separate wattmeter elements are adjusted so that the torque of each is to the torque of the others as the power of the respective generators, then the actuating torque on the shaft 95 is always proportional to the sum of the power delivered by all of the generators connected to the prime mover. I prefer that all of the actuating elements be identical insofar as the coils and armature are concerned and that proper relationship between the elements be secured through proper selection of shunts 11, 21, 31 and 41, but it is not essential that all of the actuating elements be alike as proper proportionality between the various actuating elements may be obtained by variation in the windings of the elements to suit the generators and shunts.

The restraining element has a field 81e, with fixed value, being connected to the battery 28, and an armature 82e, the strength of which is proportional to the speed of the prime mover, being connected through suitable resistance 85 to the variable voltage generator 30. The restraining torque on the shaft 95 is therefore proportional to the speed of the prime mover and, neglecting the action of the relay compound fields as has been done in this and the foregoing paragraph, the balancing position of the relay is at some constant value of prime mover torque, depending on the adjustment of the controllable resistance 85, and regardless of the speed of the prime mover and the power delivered.

The action of modifying compound fields will now be explained, first considering the compounding field 83e of the restraining element of the relay which is connected in series with the armature 81a of the relay and is in parallel with a suitable shunting resistance 84e. The actuating current for field 83e is therefore proportional to the load current of main generator 10. The field 83e is so connected that the combined field 81e and 83e decreases in strength as the load current increases. Therefore the actuating force decreases progressively as the load current and power of the main generator increases, and the relay having a decreasing restraining force will act to control the field of the main generator in such a manner that the main generator will deliver a progressively lower torque as its load increases.

The compounding field 83a of the actuating element shown as the upper element of the relay is connected to act cumulatively with field 81a of the same relay element. Coil 83a in parallel with shunt 84a is connected in series with the armature 81a of the same relay element. Its actuating current is therefore proportional to the load current of the generator 10 whose power is measured by this relay element. With coil 83a connected cumulatively with field 81a, the force of this relay actuating element will increase progressively as the load current and power of the main generator increases, and the relay will act to control the field of the main generator in such a manner that the main generator will deliver a progressively lower torque as its load increases.

Each of the other relay elements may have a compounding field in series with the armature and shunted by a suitable resistance as shown. These compounding fields should be connected cumulatively with their respective potential coils. By proper selection of the compounding fields and their respective shunts, the torque can be made to fall with increasing load in any manner desired. Furthermore, it is not necessary that both the restraining element and the actuating element be provided with compounding fields as the modifying action can be obtained with the compounding of the restraining element alone, or by compounding of the main actuating element alone.

The lower contact 89 on the relay shaft 95, when displaced to the right touches the vibrating contact 77 and furnishes battery current to the motor operated rheostat 45 through the field 47 of the rheostat motor. This operates the motor in a direction whereby the amount of resistance 49 in the field circuit of the main generator is increased and the field strength of the main generator is reduced. Displacement of contact 89 to the left energizes the motor operated rheostat from the battery 28 through vibrating contact 78 and coil 48. This operates the motor in a direction to decrease the amount of resistance 49 in the field circuit of the main generator and to increase the field strength of this generator.

As shown in Figure 2, the vibrating contacts 77 and 78 are vibrated by coils 91 and 90 respectively, receiving current from the battery 28 through contacts 93 and 92. These contacts open the battery circuit to the coils 90 and 91 when the contacts have been attracted to the coils and thus allow the contacts 77 and 78 to return by spring action. The circuits will be again made on the return, thus causing a new attraction and a continued vibration of the contacts.

It will be seen that on slight displacements of the shaft 95, contact 89 will meet one of the vibrating contacts for only a short period when the latter is at its innermost position of vibration. Under this condition the rheostat 45 will act very slowly. For further displacements of the shaft 95, contact 89 will meet one of the vibrating contacts for a greater length of time and the rheostat 45 will therefore move faster. For extreme displacement of shaft 95, contact 89 will be continuously in touch with one of the vibrating contacts and the rheostat 45 will run continuously. When this occurs, contact 86 will connect battery current through contact 87, if the displacement is to the right, and energize relay 57, which will open contacts 60 and remove the short circuit from around resistance 61, thus quickly decreasing the field strength of generator 10; and if the displacement is to the left, contact 86 will connect battery current through contact 88 and energize relay 59, thereby quickly reducing the value of resistance 49 in series with the main generator field and quickly increasing the field strength of the main generator.

Relay 64 is operated by the potential of generator 30 through leads 32a and 32b, and is thus controlled by the speed of the prime mover. Normally all contacts on this relay are held open. However, when the prime mover speed reaches a predetermined maximum value, contacts 73 close and short circuit resistance 75, thereby increasing the strength of the restraining element of relay 80, which will then act to increase the strength of the main generator field and the torque of the main generator. This action will act to restrain the movement of the prime mover and to limit its speed to the predetermined value.

When the prime mover reaches a predetermined minimum speed, contacts 71 will be made, or at a lower predetermined minimum speed contacts 72 will be made. Contacts 71 are controlled through switch 79. The closing of these contacts connects battery current through contact 69 of relay 63 and energizes relay 62 whereby contacts 67 are broken and the short circuit around resistance 74 is opened and the restraining element of relay 80 is weakened. Relay 80 then acts to decrease the resistance in series with the main generator field and the torque of the main generator is reduced which acts to increase the prime mover speed, and to limit the minimum speed of the prime mover.

The maximum and minimum prime mover speed may be as close to each other as is desired, and when it is desired to operate close to the maximum power output of the prime mover, the relay 64 is so set that it will hold the prime mover in a range of speed where substantially the maximum power output of the prime mover can be developed. Contact 73 would normally be set to close at a speed corresponding substantially to the speed for maximum power output. If contacts 71 were set to close at a speed only slightly under this value, then simply by closing switch 79, the set would function to operate at substantially maximum output with the vehicle operating at a variable speed to utilize this maximum output.

By opening switch 71 the set would operate down to as low a speed of the prime mover as may be desirable, with the speed of the vehicle under control and the engine speed varying to produce the amount of power required to operate the vehicle at the controlled speed.

Relay 63 is operated by current from generator 36, the voltage of which increases with increased vehicle speed. Thus when the vehicle reaches a predetermined maximum speed, relay 63 operates and contacts 70 close and short circuit resistance 75, thereby increasing the strength of the restraining element of relay 80, which in turn will act to decrease the resistance in series with the field 15 of generator 10. This increases the torque and thereby decreases the speed and power of the prime mover, which in turn acts to reduce the speed of the vehicle.

It can be seen that normally the relay 64 acts on underspeed of the prime mover to increase the resistance in series with coil 81e and relay 63 acts on overspeed of the vehicle to decrease the resistance in series with coil 81e. These two conditions are incompatible with each other and will occur simultaneously only when the vehicle is traveling down grade and requires very little power to cause it to overspeed. However, it is to provide for this condition that contact 71 of relay 64 is interlocked through the contacts 68 and 69 of relay 63. Thus, when relay 63 is actuated through overspeed of the vehicle, underspeed of the prime mover will not energize relay 62 through contact 69 but instead will act through contact 68 to energize control motor 18 which acts through spring 19 to move rod 2 in a downward direction. This reduces the torque and horsepower of the prime mover and at the same time places a portion of resistance 9 in series with coil 81e of relay 80, thus weakening the restraining element of the relay and allowing the relay to properly govern for the reduced prime mover torque occasioned by the change in the control of the propelling fluid caused by the movement of rod 2. It will further be noticed that contact 70 of relay 63 is interlocked through contact 98 of relay 64 so that resistance 75 will not be short circuited by contact 70 when relay 64 is in a position to actuate the minimum prime mover speed control.

The control of the vehicle speed is normally effected by movement of the handle 7 sliding on rod 27. In the position shown an upward movement of the handle 7 will increase the amount of resistance 8 in series with coil 81e, thus weakening the restraining force of the relay 80. The relay will then act to weaken the field of main generator which will in turn act to reduce the restraining torque on the prime mover thus causing an increase in speed and horsepower of the prime mover and consequently an increase in speed of the vehicle. No action on the rod 2 occurs by upward movement of the handle 7 from the position shown, and normal running operation is with the handle 7 in the position shown or in a position above that shown.

Downward movement of the handle will cause a downward movement of rod 2 as well as an increase in the amount of resistance 9 in series with coil 81e of relay 80. This will cut down the torque and power of the prime mover by movement of the control rod and at the same time permit the relay to properly balance for the new prime mover condition. In this way the vehicle speed will be reduced.

Where the normal torque characteristics of the prime mover require no modification for satisfactory operation, the pivot 26 may be a fixed member and the spring 25 and coils 3 and 4 may be omitted. However, where the characteristics of the prime mover require modification, as is essential with a "common rail" Diesel engine, the pivot 100 is fixed and the position of pivot 26 is controlled by spring 25 and coils 3 and 4.

For a "common rail" Diesel, spring 25 tends to lower pivot 26 and rod 2, while coil 3 which is energized from generator 30 through adjustable resistance 5, tends to raise pivot 26 and rod 2. As coil 3 is energized from generator 30, its strength increases as the speed of the prime mover increases. Thus, the rod 2 will lift with increases of prime mover speed. Rod 2 on lifting, will act to increase the number of degrees of rotation through which the fuel-injection valve is open and thus will tend to maintain the time of opening of the valve per revolution, as the higher the engine speed, the greater the number of degrees of opening that are required to represent an equal time of opening per power stroke of the engine.

Where a prime mover other than a "common rail" Diesel requires modification of its natural characteristic, such modification will usually lie in somewhat decreasing the torque of the prime mover with increased speed in order to provide increased stability of operation. In this case, spring 25 pulling downward to lower pivot 26 and rod 2 is opposed by coil 4 connected through resistance 6 to the battery bus 29. This connection alone would hold pivot 26 in a fixed position, but coil 3 actuated by current from generator 30 through resistance 5, modifies the action of coil 4. Coil 3 is connected differentially to coil 4 so that the upward pull of the coils becomes weaker as the speed of the prime mover increases and the spring 25 will act on pivot 26 and rod 2 so that they will be moved downward as the engine speed increases. This acts to slightly reduce the engine torque with increase of engine speed. The amount that the torque is reduced with engine speed can be controlled as desired by proper selection of spring 25, coils 3 and 4, and resistances 5 and 6.

Many changes can be made in the details without departing from the spirit of my invention, and having described it so that it is readily understandable by one skilled in the art, I claim:

1. In combination a prime mover, an electric generator having a field and an armature driven by the prime mover, a motor supplied with energy by said generator, and a relay controlling the generator field, said relay having an element responsive to the power output of the generator opposed by an element responsive to the speed of the prime mover.

2. In combination, a prime mover, an electric generator driven thereby, said generator having armature and field windings, a variable load for said generator, a control device having an element substantially measuring the power output of the generator in opposition to an element substantially measuring the speed of the prime mover, and means responsive to the operation of the control device to adjust the current in the generator field winding and the torque imposed on the prime mover.

3. In combination, a prime mover, a generator driven thereby, means forming an electrical load for receiving energy from said generator, means for supplying excitation current to said generator, a regulating device for controlling the flow of said excitation current, and means having an actuating force varying in substantial accordance with the power of said generator and a restraining force varying in substantial accordance with the speed of the prime mover for controlling said regulating device.

4. In combination, a prime mover, a generator driven thereby, means forming an electrical load for receiving energy from said generator, means for supplying excitation current to said generator, a regulating device for controlling the flow of said excitation current, means having an actuating force varying in substantial accordance with the power of said generator and a restraining force varying in substantial accordance with the speed of the prime mover for controlling said regulating device, and means adapted at will to permit a change of standard in operation of last-mentioned means.

5. In combination, a prime mover, a plurality of electric generators driven by the prime mover, means forming electrical loads for receiving energy from said generators, means for supplying excitation to one of said generators and a regulating device responsive to changes in the power requirements of the several electrical loads for controlling said excitation, whereby as the sum of the electrical loads increases, the speed of the prime mover increases.

6. In combination, a prime mover, a plurality of generators driven thereby, means forming electrical loads for receiving energy from said generators, means for supplying excitation current to one of said generators, a regulating device for controlling the flow of said excitation current, and means having an effective force varying in substantial accordance with the sum of the torque of the several generators for controlling said regulating device.

7. In combination, a prime mover, a plurality of generators driven thereby, means forming electrical loads for receiving energy from said generators, means for supplying excitation current to one of said generators, a regulating device for controlling the flow of said excitation current, and means having an effective force varying in substantial accordance with the sum of the torque of the several generators for controlling said regulating device, whereby the torque imposed upon the prime mover is controlled.

8. In combination, a prime mover, a plurality of generators driven thereby, means forming electrical loads for receiving energy from said generators, means for supplying excitation current to one of said generators, a regulating device for controlling the flow of said excitation current, and means having an effective force varying in substantial accordance with the sum of the torque of the several generators for controlling said regulating device, whereby as the load on the prime mover increases, the torque imposed upon the prime mover decreases.

9. In combination, a prime mover, a plurality of generators driven thereby, means forming electrical loads for receiving energy from said generators, means for supplying excitation current to one of said generators, a regulating device for controlling the flow of said excitation current, and means having an effective force varying in substantial accordance with the sum of the torque of the several generators for controlling said regulating device, whereby as the load on the prime mover increases, the speed of the prime mover increases.

10. In combination, a prime mover, a plurality of generators driven thereby, means forming electrical loads for receiving energy from said generators, means for supplying excitation current to one of said generators, and a regulating device for controlling said excitation current, said regulating device having a plurality of actuating members each responsive to the load of one of the plurality of generators.

11. In combination, a prime mover, a plurality of generators driven thereby, means forming electrical loads for receiving energy from said generators, means for supplying excitation current to one of said generators, and a regulating device for controlling said excitation current, said regulating device having a plurality of actuating members each responsive substantially to the power output of one of the plurality of generators.

12. In combination, a prime mover, a plurality of generators driven thereby, means forming electrical loads for receiving energy from said generators, means for supplying excitation current to one of said generators, and a regulating device for controlling said excitation current, said regulating device having a plurality of actuating members each responsive to the load of one of the plurality of generators and a restraining member responsive substantially to the speed of the prime mover.

13. In combination, a prime mover, a plurality of generators driven thereby, means forming electrical loads for receiving energy from said generators, means for supplying excitation current to one of said generators, and a regulating device for controlling said excitation current, said regulating device having a plurality of actuating members, each responsive to the load of one of the plurality of generators, a restraining member responsive substantially to the speed of the prime mover, and a modifying member responsive to the load of one of the generators whereby as the load increases, the sped of the prime mover increases.

14. In combination, a prime mover having controlling means for the prime mover propelling fluid, a generator having a field and an armature driven by the prime mover, a variable load for said generator, means responsive to said variable load, acting to control the current in the generator field winding and the torque imposed on the prime mover, and means responsive to the speed of the prime mover acting on the controlling means for the prime mover propelling fluid, whereby the torque of the prime mover is controlled.

15. In combination, a prime mover, having controlling means for the prime mover propelling fluid, a generator having a field and an armature driven by the prime mover, a variable load for said generator, means responsive to said variable load, acting to control the current in the generator field winding and the torque imposed on the prime mover, and means responsive to the speed of the prime mover acting on the controlling means for the prime mover propelling fluid, whereby the torque of the prime mover is controlled at slightly decreasing values as the speed of the prime mover increases.

16. In combination, an engine having a "common rail" fuel injection system, a generator having a field and an armature driven thereby, a variable load for said generator, means responsive to said variable load acting to control the current in the generator field winding and the torque imposed on the prime mover, and means responsive to the speed of the prime mover acting to increase the angle of injection valve opening as the prime mover speed increases, whereby the time of the valve opening per revolution is maintained substantially constant and the torque of the engine is controlled.

17. In combination, an engine having a "common rail" fuel injection system, a generator having a field and an armature driven thereby, a variable load for said generator, means responsive to said variable load acting to control the current in the generator field winding and the torque imposed on the prime mover, and means responsive to the speed of the prime mover acting to increase the angle of injection valve opening as the prime mover speed increases, whereby the time of the valve opening per revolution is maintained substantially constant and the torque of the engine is controlled at only slightly decreasing values as the speed of the prime mover increases.

18. In combination, a prime mover, a generator driven thereby, a motor forming an electrical load for receiving energy from said generator, means for supplying excitation current to the generator, means for controlling the flow of said excitation current whereby as the electrical load increases the torque of said generator decreases, means responsive to the speed of said prime mover co-operating to limit said prime mover speed, means responsive to the speed of said motor co-operating to limit said motor speed and means interlocking said speed responsive means acting to change their manner of operation when the prime mover is at its minimum limiting speed, simultaneously to the motor being at its maximum limiting speed.

19. In combination, a prime mover having means for controlling the prime mover propelling fluid, an electric generator driven by the prime mover, said generator having armature and field winding, a motor driven by said generator, a control device for adjusting the strength of said generator field winding, means responsive to the speed of the prime mover acting on said control device to limit the minimum speed of said prime mover, means responsive to the speed of the motor acting on said control device to limit the maximum speed of said motor and means for transferring the action of the speed responsive means from the control device to the means for controlling the prime mover propelling fluid when both the prime mover reaches the minimum speed and the motor reaches maximum speed.

HENRY ROSENTHAL.